United States Patent
Hu

(10) Patent No.: US 7,814,752 B2
(45) Date of Patent: Oct. 19, 2010

(54) DECOUPLING CONTROL STRATEGY FOR INTERRELATED AIR SYSTEM COMPONENTS

(75) Inventor: Guangdi Hu, Peoria, IL (US)

(73) Assignee: Caterpillar Inc, Peoria, IL (US)

(*) Notice: Subject to any disclaimer, the term of this patent is extended or adjusted under 35 U.S.C. 154(b) by 375 days.

(21) Appl. No.: 11/711,723

(22) Filed: Feb. 28, 2007

(65) Prior Publication Data

US 2008/0208432 A1 Aug. 28, 2008

(51) Int. Cl.
F02B 33/44 (2006.01)
F02D 23/00 (2006.01)
F02M 25/07 (2006.01)

(52) U.S. Cl. .......................... 60/605.2; 60/611; 60/602; 701/104; 701/108; 123/568.12; 123/568.21

(58) Field of Classification Search ................ 60/605.2, 60/611, 602; 701/104, 108; 123/568.12, 123/568.21; F02M 25/07
See application file for complete search history.

(56) References Cited

U.S. PATENT DOCUMENTS

| | | | | |
|---|---|---|---|---|
| 6,035,639 A * | 3/2000 | Kolmanovsky et al. | .... | 60/605.2 |
| 6,128,902 A * | 10/2000 | Kolmanovsky et al. | .... | 60/605.2 |
| 6,360,541 B2 * | 3/2002 | Waszkiewicz et al. | ...... | 60/605.2 |
| 6,378,305 B1 * | 4/2002 | Sumser et al. | ............. | 60/605.2 |
| 6,675,579 B1 * | 1/2004 | Yang | ........................ | 60/605.2 |
| 6,681,171 B2 * | 1/2004 | Rimnac et al. | .............. | 701/108 |
| 6,701,244 B2 * | 3/2004 | Oota et al. | .................. | 701/104 |
| 6,701,710 B1 * | 3/2004 | Ahrens et al. | .............. | 60/605.2 |
| 6,817,173 B2 | 11/2004 | Paffrath et al. | ................ | 60/290 |
| 6,899,090 B2 * | 5/2005 | Arnold | ...................... | 60/605.2 |
| 7,021,058 B2 * | 4/2006 | Scheinert | ..................... | 60/611 |
| 7,165,540 B2 * | 1/2007 | Brookshire et al. | ........ | 60/605.2 |
| 7,254,948 B2 * | 8/2007 | Gustafson et al. | ............. | 60/611 |
| 7,261,098 B2 * | 8/2007 | Vigild et al. | ............... | 60/605.2 |
| 7,275,374 B2 * | 10/2007 | Stewart et al. | ................ | 60/602 |
| 7,296,561 B2 * | 11/2007 | Shirakawa et al. | ......... | 60/605.2 |
| 7,503,175 B2 * | 3/2009 | Isogai | ........................ | 60/605.2 |
| 2003/0000507 A1 * | 1/2003 | Kobayashi et al. | ......... | 60/605.2 |
| 2007/0125083 A1 * | 6/2007 | Rollinger et al. | ........... | 60/605.1 |
| 2008/0190107 A1 * | 8/2008 | Ogiso | ........................ | 60/605.2 |
| 2009/0038308 A1 * | 2/2009 | Nagae | ........................ | 60/605.2 |

FOREIGN PATENT DOCUMENTS

| | | |
|---|---|---|
| EP | 0053464 | 6/1982 |
| EP | 0135176 | 3/1985 |
| EP | 0239095 | 9/1987 |
| EP | 1219809 | 11/2008 |
| JP | 2002161791 A * | 6/2002 |
| JP | 2002332879 A * | 11/2002 |
| JP | 2007278145 A * | 10/2007 |
| WO | 2006/107525 | 10/2006 |

* cited by examiner

Primary Examiner—Thai Ba Trieu
(74) Attorney, Agent, or Firm—Finnegan, Henderson, Farabow, Garrett & Dunner LLC

(57) ABSTRACT

A fluid control system for an engine is disclosed. The fluid control system may have a first fluid control component, a second fluid control component, and a controller in communication with the first and second fluid control components. The controller may be configured to determine an operational change associated with the first fluid control component to achieve desired operation of the engine. The controller may also be configured to determine an effect the operational change will have on performance of the second fluid control component, and adjust operation of the second fluid control component to accommodate the effect substantially simultaneously with implementation of the operational change.

15 Claims, 2 Drawing Sheets

DECOUPLING CONTROL STRATEGY FOR INTERRELATED AIR SYSTEM COMPONENTS

TECHNICAL FIELD

The present disclosure relates generally to a control strategy and, more particularly, to a control strategy for decoupling interrelated air system components.

BACKGROUND

Internal combustion engines such as, for example, gasoline engines, diesel engines, and gaseous fuel powered engines, combust a mixture of air and fuel to produce a power output. The amount of air and fuel, and the ratio of air-to-fuel introduced into a combustion chamber of the engine can affect the power output, efficiency, and exhaust emissions of the engine. Typically, the amount of air introduced into the engine and the ratio of air-to-fuel is controlled by a number of different fluid handling components located in both the induction and exhaust systems of the engine.

For example, a turbocharger includes a turbine, driven by exhaust from the engine, which directly drives a compressor to pressurize air directed into the engine. Depending on an internal geometry setting of the turbine and compressor, more or less air will be compressed to a higher or lower pressure. In another example, a throttle valve located upstream or downstream of the compressor functions to selectively restrict the flow of air into the engine. A restrictive setting of the throttle valve limits the flow rate and/or pressure of compressed air entering the engine, while a nonrestrictive setting has little effect on the air entering the engine. The settings on the turbocharger and the throttle valve are generally independently controlled in response to one or more inputs.

Although the settings of the various fluid handling components are generally independently controlled, the effects of these settings may be interrelated. In other words, a change in the restriction of the throttle valve mentioned above can affect operation of the turbocharger and characteristics of the air pressurized by the turbocharger. Likewise, a change in the settings of the turbocharger can affect operation of the throttle valve and characteristics of the air restricted by the throttle valve. Because of this interconnected relationship, an instability within the fluid handling system can be generated when each component is independently controlled.

One attempt to minimize the likelihood of instability in a fluid handling system has been described in U.S. Pat. No. 6,817,173 (the '173 patent) issued to Paffrath et al. on Nov. 16, 2004. The '173 patent describes a method and apparatus for the simultaneous adjustment of an air intake stream and a secondary air stream directed into the exhaust system of an internal combustion engine. The secondary air stream is produced by a compressor driven by a turbine. The turbine is housed in a bypass duct arranged in parallel with a throttle valve associated with the air intake stream.

The amount of secondary air required to minimize instability is dependent upon a throttle valve setting. To create compensation for this, a control valve is connected through a connecting duct to the bypass duct to regulate a cross section of the bypass duct as a function of throttle valve opening. In the event of an opening of the throttle valve, the cross section of the bypass duct can be expanded simultaneously so that a pressure drop across the turbine, produced by throttle valve opening, does not produce system instabilities.

Although the system of the '173 patent may minimize system instabilities associated with two interrelated fluid handling components, it may be complex and costly. That is, in order to compensate for the effect of one component's operation on another, additional components (i.e., the control valve and connecting duct) are required. These additional components increase the control difficulty and expense of the system.

The disclosed fluid control system is directed to overcoming one or more of the problems set forth above.

SUMMARY OF THE INVENTION

In one aspect, the present disclosure is directed toward a fluid control system for an engine. The fluid control system may include a first fluid control component, a second fluid control component, and a controller in communication with the first and second fluid control components. The controller may be configured to determine an operational change associated with the first fluid control component to achieve desired operation of the engine. The controller may also be configured to determine an effect the operational change will have on performance of the second fluid control component, and adjust operation of the second fluid control component to accommodate the effect substantially simultaneously with implementation of the operational change.

In another aspect, the present disclosure is directed toward a method of regulating fluid flow through an engine. The method may include determining an operational change associated with a first fluid control component to achieve desired operation of the engine. The method may also include determining an effect the operational change will have on performance of a second fluid control component, and adjusting operation of the second fluid control component to accommodate the effect while substantially simultaneously implementing the required operational change.

DETAILED DESCRIPTION

Figure 1:
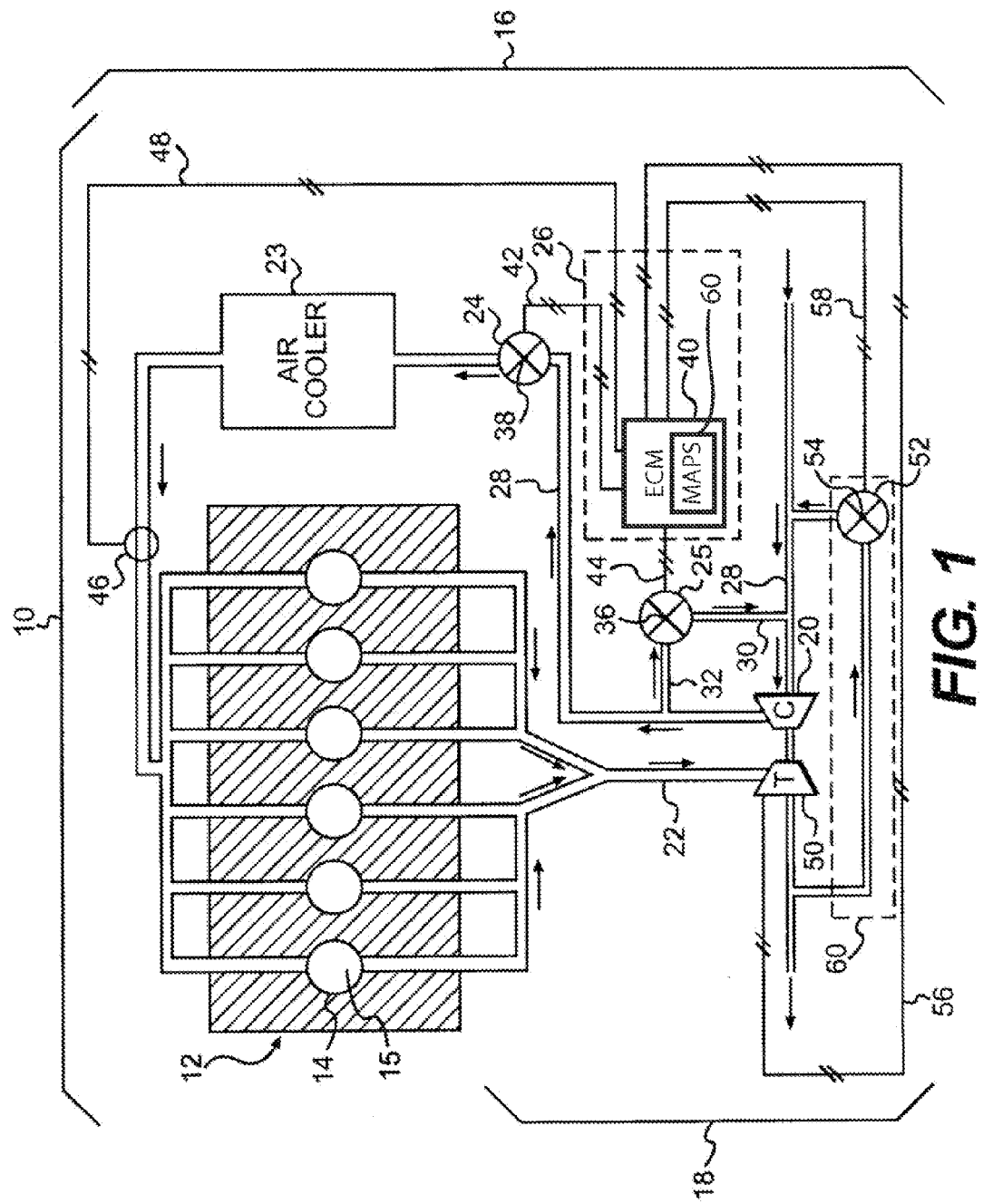
FIG. 1 is a diagrammatic illustration of an exemplary disclosed power system.

FIG. 1 illustrates an exemplary disclosed engine 10 having multiple components that cooperate to produce a power output. In particular, engine 10 may include an engine block 12 that defines a plurality of cylinders 14, a piston (not shown) slidably disposed within each cylinder 14, and a cylinder head (not shown) associated with each cylinder 14. The piston, cylinder head, and cylinder 14 may form a combustion chamber 15. In the illustrated embodiment, engine 10 includes six combustion chambers 15. However, it is contemplated that engine 10 may include a greater or lesser number of combustion chambers 15 and that the combustion chambers 15 may be disposed in an "in-line" configuration, a "V" configuration, or any other suitable configuration. For the purposes of this disclosure, engine 10 is depicted and described as a four-stroke gasoline engine. One skilled in the art will recognize, however, that engine 10 may embody any other type of internal combustion engine such as, for example, a diesel engine or a gaseous fuel-powered engine.

As also shown in FIG. 1, engine 10 may include a plurality of air handling systems that facilitate production of the power output. In particular, engine 10 may include an air induction system 16, an exhaust system 18, and an exhaust gas recirculation (EGR) system 60. It is contemplated that engine 10 may include additional non-air handling systems such as, for example, a fuel system, a lubrication system, a cooling system, and other such engine systems that are known in the art.

Air induction system 16 may include a means for introducing charged air into combustion chambers 15 of engine 10. For example, air induction system 16 may include a compressor 20 in fluid communication with one or more inlet ports (not shown) of each cylinder head, an air cooler 23 disposed downstream of compressor 20, a bypass valve 25 disposed in parallel with compressor 20, and a throttle valve 24 disposed upstream or downstream of compressor 20. It is contemplated that additional and/or different components may be included within air induction system 16 such as, for example, an air cleaner, a pressure relief device, and other means known in the art for introducing charged air into combustion chambers 15.

Compressor 20 may compress the air flowing into engine 10 to a predetermined pressure level and direct the compressed air to the cylinder heads via a fluid conduit 28. Compressor 20 is directly driven by turbine 50, which is driven by exhaust gas, as described below. It is contemplated that compressor 20 may embody a fixed geometry compressor, a variable geometry compressor, or any other type of compressor known in the art. It is also contemplated that multiple compressors 20 may alternatively be included within air induction system 16 and disposed in a series or parallel relationship.

Air cooler 23 may embody an air-to-air heat exchanger or an air-to-liquid heat exchanger in fluid communication with fluid conduit 28. Air cooler 23 may transfer heat to or from the air compressed by compressors 20, prior to the compressed air entering combustion chambers 15 of engine 10. For example, air cooler 23 may include a tube and shell type heat exchanger, a plate type heat exchanger, or any other type of heat exchanger known in the art.

Throttle valve 24 may be located within fluid conduit 28 to control a flow rate and/or pressure of air delivered to combustion chambers 15. Throttle valve 24 may be positioned downstream of compressor 20 at any suitable location within fluid conduit 28 such as, for example, before or after air cooler 23. Throttle valve 24 may alternatively be located upstream of compressor 20, if desired. Throttle valve 24 may include a valve element 38 movable from a flow-passing position against a spring bias toward a flow-restricting position. When in the flow-passing position, atmospheric air may be directed into engine 10 substantially unrestricted. The term restricted, for the purposes of this disclosure, is to be interpreted as at least partially blocked from fluid flow. It is also contemplated that valve element 38, when in the flow-restricting position, may fully block air flow. Valve element 38 may embody a butterfly valve element, a shutter valve element, a gate valve element, a ball valve element, a globe valve element, or any other type of valve element known in the art. Throttle valve 24 may include means for automatically moving valve element 38 in response to a control signal, and sensing means for sensing the position of valve element 38 and generating a position signal in response thereto.

Bypass valve 25 may be fluidly connected to fluid conduit 28 at a point upstream of compressor 20 via a fluid conduit 30, and at a point down stream of compressor 20 via a fluid conduit 32. Bypass valve 25 may include a valve element 36 movable to control the amount of compressed air delivered to combustion chambers 15. In particular, valve element 36 may be movable from a flow blocking position against a spring bias, at which substantially all of the compressed air from compressor 20 is directed to engine 10, toward a flow-passing position, at which a portion of the compressed air from compressor 20 is diverted from engine 10 at the point downstream of compressor 20 to the point upstream of compressor 20 via fluid conduits 30 and 32. Bypass valve 25 may include a butterfly valve element, a shutter valve element, a gate valve element, a ball valve element, a globe valve element, or any other type of valve element known in the art. Bypass valve 25 may include means for automatically moving valve element 36 in response to a control signal, and sensing means for sensing the position of valve element 36 and generating a position signal in response thereto.

Exhaust system 18 may include a means for directing exhaust flow out of engine 10 to the atmosphere by flow lines 22. The flow lines 22 may include pipes, tubing, and/or other exhaust flow carrying means known in the art. For example, exhaust system 18 may include a turbine 50 connected to receive exhaust from engine 10. It is contemplated that exhaust system 18 may include additional and/or different components such as, for example, emission controlling devices such as particulate traps, nitrous oxides ($NO_x$) absorbers, other catalytic devices, attenuation devices, and other means known in the art for directing exhaust flow out of engine 10.

Turbine 50 may be connected to drive compressor 20. In particular, as the hot exhaust gases exiting engine 10 expand against vanes (not shown) of turbine 50, turbine 50 may rotate and drive compressor 20. Turbine 50 may embody a variable geometry that allows a change in operating characteristics and effective size as operating conditions of engine 10 change. For example, turbine 50 may include a plurality of vanes (not shown) that are moveable to effectively decrease the cross-sectional area of turbine 50, allowing the turbocharger to operate as a small turbocharger at low engine speeds, or increase the cross-sectional area of turbine 50, allowing the turbocharger to operate as a large turbocharger at high engine speeds. Adjustment to the vanes of turbine 50 for operation as a small turbocharger at low engine speeds allows compressor 20 to create boost at the low exhaust gas speeds that occur at low engine speeds. Adjustment of the vanes of turbine 50 for operation as a large turbocharger at high engine speeds allows compressor 20 to provide the large volume of air necessary at high engine speeds and prevent choking of the engine. It is contemplated that more than one turbine 50 may alternatively be included within exhaust system 18 and disposed in a parallel or series relationship, if desired. It is also contemplated that turbine 50 may be omitted and compressor 20 driven by engine 10 mechanically, hydraulically, electrically, or in any other manner known in the art, if desired.

EGR system 60 may be used for controlling emissions of undesirable pollutant gases and particulates produced in operation of engine 10. EGR system 60 may primarily recirculate gas from exhaust system 18 into air induction system 16 of engine 10. The exhaust gas which is reintroduced to combustion chamber 15 reduces the concentration of oxygen therein, which in turn lowers the maximum combustion temperature within combustion chamber 15 and slows the chemical reaction of the combustion process, decreasing the formation of $NO_x$. Furthermore, the exhaust gas typically contains unburned hydrocarbons which are burned on reintroduction into combustion chamber 15 to further reduce the emission of undesirable pollutants from engine 10.

EGR system 60 may include an EGR valve 52, which may be located upstream or downstream of turbine 50 to regulate a flow of exhaust from combustion chambers 15. The exhaust gas emitted from the engine 10 may be re-introduced into the engine 10 through compressor 20. EGR valve 52 may include a valve element 54 movable from a flow-passing position against a spring bias toward a flow-restricting position. It is contemplated that valve element 54, when in the flow-restricting position, may fully block exhaust from flowing back into engine 10. EGR valve 52 may include a butterfly valve element, a shutter valve element, a gate valve element, a ball valve element, a globe valve element, or any other type of valve element known in the art. EGR valve 52 may include means for automatically moving valve element 54 in response to a control signal, and sensing means for sensing the position of valve element 54 and generating a position signal in response thereto.

A sensor 46 may be associated with one or more of induction system 16, exhaust system 18, and EGR system 60. Sensor 46 is shown, for example, in a passageway of induction system 16. One skilled in the art, however, will recognize that sensor 46 may also include sensing elements located in, for example, a passageway of the exhaust system 18, within engine block 12, within combustion chamber 15, or in a passageway of EGR system 60. Sensor 46 may detect and communicate parameters including, for example, pressures, temperatures, air and/or exhaust flow rates, and fluid compositions.

A control system 26 may regulate the operation of one or more of turbine 50, throttle valve 24, bypass valve 25, and EGR valve 52 in response to one or more inputs. In particular, control system 26 may include a controller 40 that communicates with throttle valve 24 by way of a communication line 42, with bypass valve 25 by way of a communication line 44, with sensor 46 by way of a communication line 48, with turbine 50 by way of a communication line 56, and with EGR valve 52 by way of a communication line 58. In response to an input from engine 10, from sensor 46, and/or from other sources, controller 40 may implement a geometry change of turbine 50 and/or move valve elements 36, 38, or 54.

Controller 40 may embody a single microprocessor or multiple microprocessors that include a means for controlling an operation of air induction system 16. Numerous commercially available microprocessors can be configured to perform the functions of controller 40. It should be appreciated that controller 40 could readily embody a general engine microprocessor capable of controlling numerous engine functions. Controller 40 may include all of the components required to run an application such as, for example, a memory, a secondary storage device, and a processor, such as a central processing unit or any other means known in the art for controlling turbine 50, throttle valve 24, bypass valve 25, and EGR valve 52. Various other known circuits may be associated with controller 40, including power supply circuitry, signal-conditioning circuitry, solenoid driver circuitry, communication circuitry, and other appropriate circuitry.

Controller 40 may receive and store in memory communication from various sensors and components known in the art, including measurements of, for example, air and/or exhaust flow, temperature, pressure, fluid composition, and position. Controller 40 may also transmit signals to various engine control sensors and devices known in the art. Some examples of devices that controller 40 may communicate with are sensor 46, turbine 50, throttle valve 24, bypass valve 25, and EGR valve 52. Controller 40 may analyze and compare received and stored data, and, based on instructions and data stored in memory or input by a user, determine whether action is required. For example, controller 40 may compare received values with target values stored in memory, and, based on the results of the comparison, controller 40 may transmit signals to one or more components to cause adjustments thereto.

The memory of controller 40 may include memory means known in the art for storing data relating to engine operation. The data may be stored in the form of one or more maps 60 that define relationships between various engine components and engine operation parameters. These maps 60 may be generated by performing tests on the operation of engine 10 under a variety of operating conditions while varying parameters such as engine speed, air flow, and fuel delivery. Data from the tests may show correlation among the operation of one or more of the turbine 50, throttle valve 24, bypass valve 25, and EGR valve 52. For example, the maps 60 may contain data correlating the effects that adjustments to turbine 50 may have on the operation of throttle valve 24, bypass valve 25, and/or EGR valve 52. Similarly, the maps 60 may contain data correlating the effects of adjustments to throttle valve 25, bypass valve 25, or EGR valve 52 on the operation of the turbine 50, throttle valve 24, bypass valve 25, and/or EGR valve 52. The maps 60 may be used by controller 40 to control the operation of engine 10.

The maps 60 stored in memory of controller 40 may be generated from test data and may contain detailed information on the optimum setting for each of the turbine 50, throttle valve 24, bypass valve 25, and EGR valve 52 based on the desired operating speed and fuel input parameters of engine 10. The interdependent relationships of turbine 50, throttle valve 24, bypass valve 25, and EGR valve 52 may be non-linear, and may vary according to desired operating speed and fuel input parameters. In some instances, equations or curves may be insufficient to describe the interrelated behavior of the components. By performing instrumented measurement and testing, one or more maps 60 may be generated that contain precise settings for each component. The tests may, by way of example, set engine speed and fuel demand while varying the setting of a single component, for example throttle valve 24. At each different desired setting of throttle valve 24, the engine system would be allowed to achieve steady state operation, and the resulting steady state settings of turbine 50, throttle valve 24, bypass valve 25, and EGR valve 52 would be recorded. In this way, a detailed map 60 of the optimal setting of the turbine 50, throttle valve 24, bypass valve 25, and EGR valve 52 may be compiled for storage in memory of controller 40. The maps 60 may be generated by testing each individual engine, or by loading into the memory maps 60 derived from reference tests on similar classes of engines. Additionally, the controller 40 may update the maps 60 based on measured operating conditions of engine 10.

Controller 40 may monitor and regulate an actual air flow characteristic of the compressed air and/or exhaust directed to combustion chambers 15 based on a desired or required air flow characteristic and input from sensor 46. In particular, controller 40 may monitor engine operation to receive or determine a desired or required operational change such as, for example, a change in an air-to-fuel ratio, an air or exhaust pressure, an air or exhaust flow rate, an air or exhaust temperature, or any other appropriate change. Controller 40 may further compare the desired or required air flow characteristic to the input from sensor 46 and initiate movement of valve elements 36, 38, and 54 and/or a geometry change of turbine 50 in response to the comparison.

For example, if an increase in air flow rate, pressure, and/or air-to-fuel ratio is desired, controller 40 may initiate adjustments to valve elements 36, 38, and 54 and vanes of turbine 50. Specifically, valve element 36 of bypass valve 25 may be moved to minimize the amount of air diverted from downstream of compressor 20 to the point upstream of compressor 20. By minimizing the amount of air diverted away from engine 10, the flow rate and/or pressure of air directed from compressor 20 to the cylinder heads of engine 10 may increase, resulting in an increased air-to-fuel ratio. Valve element 38 of throttle valve 24 may also or alternatively be moved to a greater flow-passing position to decrease a restriction on the amount of air directed from compressor 20 to the cylinder heads. Similarly, valve element 54 of EGR valve 52 may also or alternatively be moved to a flow-restricting position to increase a restriction on the amount of exhaust directed from exhaust system 18 to compressor 20. Vanes of turbine 50 may also or alternatively be moved to increase the effective area of the turbine, thereby increasing the amount and pressure of air exiting the compressor.

Conversely, if a decrease in the air flow, pressure, and/or air-to-fuel ratio is desired, valve element 36 of bypass valve 25 may be moved to increase the amount of air diverted away from engine 10. Likewise, valve element 38 of throttle valve 24 may also or alternatively be moved to a flow-restricting position to increase the restriction on the compressed air flow and reduce the flow rate and pressure, resulting in a decreased air-to-fuel ratio. Valve element 54 of EGR valve 52 may also or alternatively be moved to a greater flow-passing position to increase an amount of exhaust directed from exhaust system 18 to compressor 20. Similarly, vanes of turbine 50 may be moved to decrease the effective area of the turbine, thereby reducing the amount and pressure of air exiting the compressor.

Though controller 40 may adjust each of the turbine 50, throttle valve 24, bypass valve 25, and EGR valve 52 independently, the effects of these components may be interrelated and adjustment of one may have an effect on another of the components. For example, an adjustment to valve element 38 of throttle valve 24 to increase air flow and/or pressure to combustion chamber 15 may require an adjustment to turbine 50 such that a speed of compressor 20 and/or a flow rate and pressure exiting compressor 20 remains substantially unchanged. Similarly, an adjustment to valve element 36 of bypass valve 25 to increase the amount of air diverted away from engine 10 may require an adjustment to valve element 54 of EGR valve 52 such that an exhaust-to-air ratio of fluids entering engine 10 remains substantially unchanged. Other effect interrelations between components may also be possible.

Controller 40 may determine the effect a desired or required change to one component may have on the performance of another component through the use of the maps 60 stored in the memory of controller 40. Upon determination that an operational change is desired or required, controller 40 may determine which component should be adjusted, and the adjustment amount required to cause the desired or required change. Controller 40 may then use the maps 60 to determine what effect, if any, the desired or required change may have on the performance of the other components, and an adjustment of the affected component that will accommodate the effect. Controller 40 may then simultaneously initiate the necessary change and associated adjustments to the first and secondary components.

Figure 2:
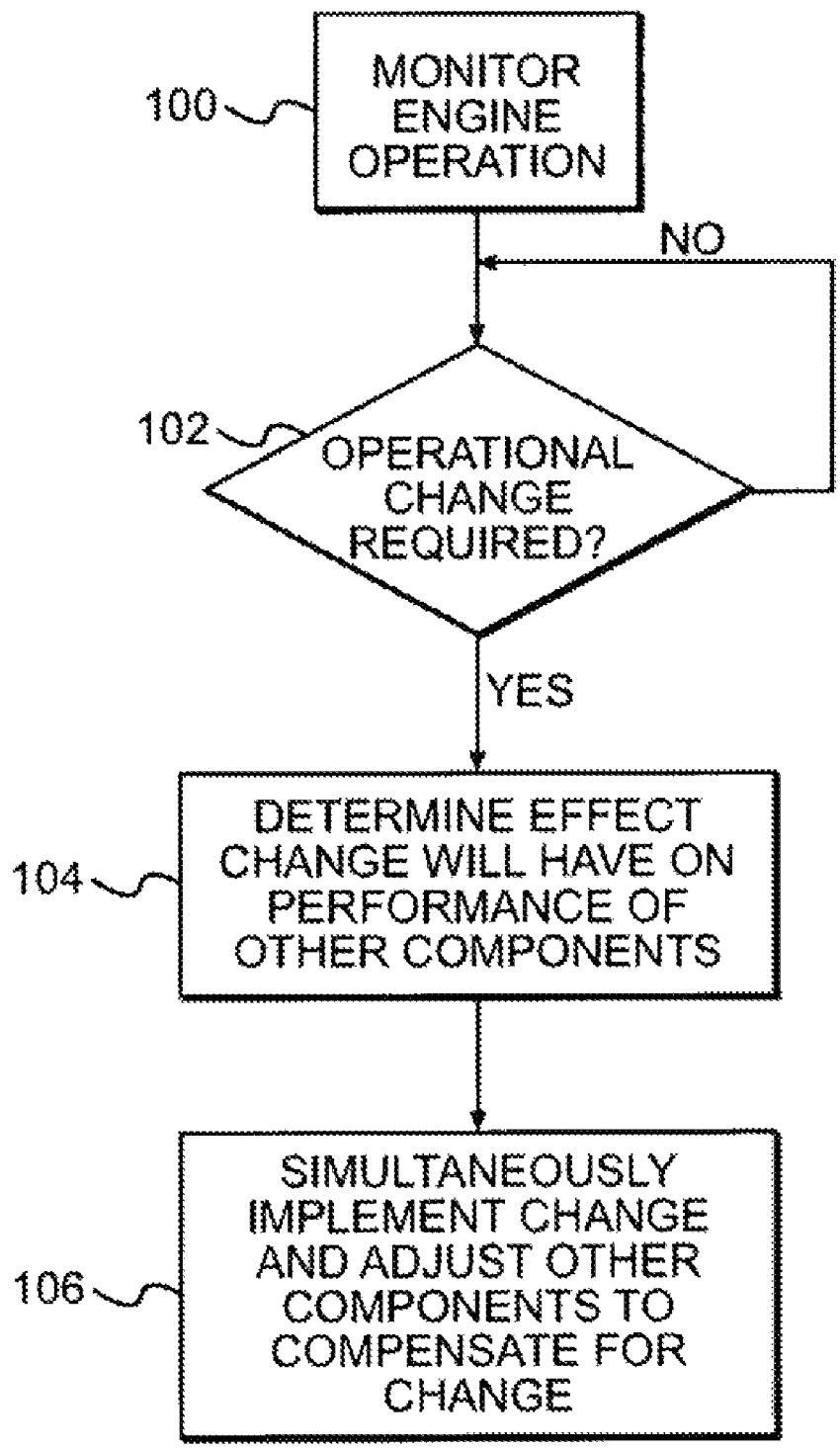
FIG. 2 is a flowchart depicting an exemplary disclosed method of operating the power system of FIG. 1.

FIG. 2 shows a flowchart illustrating an exemplary method of operating control system 26. FIG. 2 will be described in detail below.

INDUSTRIAL APPLICABILITY

The disclosed fluid control system may be used with any power system where efficient and stable control of fluid flow characteristics is desired. In particular, the disclosed system provides a simple, reliable way to change a fluid flow characteristic of one component while accommodating the effect that the change has on the operation of other components. The operation of the fluid control system 10 will now be described.

Atmospheric air may be drawn into air induction system 16 via compressor 20 where it may be pressurized to a predetermined level. Upon exiting the compressor, a portion of the air may be diverted back into the compressor 20 through bypass valve 25. The main portion of air from compressor 20 may then pass through throttle valve 24 and air cooler 23 before entering combustion chambers 15 of engine 10. Fuel may be mixed with the pressurized air before or after entering combustion chambers 15, and combusted to produce mechanical work and an exhaust flow. The exhaust flow may be directed from engine 10 to turbine 50 where the expansion of hot exhaust gases may cause turbine 50 to rotate, thereby causing connected compressor 20 to rotate and compress the inlet air. After exiting turbine 50, a portion of the exhaust gas flow may be directed to the atmosphere, and the remaining portion of the exhaust gas may be directed through EGR valve 52 to return to the inlet of compressor 20.

As depicted in the flowchart of FIG. 2, controller 40 may monitor engine operation in step 100. In step 102, based on information communicated to controller 40 by sensor 46 in engine 10, controller 40 may determine that an operational change may be required in response to desired or required air and/or exhaust flow characteristics. Controller 40 may determine that turbine 50, throttle valve 24, bypass valve 25, or EGR valve 52 must be adjusted to provide for the desired or required operational change. However, the adjustment of any one component, such as the turbine 50, throttle valve 24, bypass valve 25, and EGR valve 52, may have an effect on the performance of one or more of the other components. Therefore, in step 104, controller 40 may determine the effect an adjustment to a first component will have on one or more secondary components. Controller 40 may determine this effect by querying the data in the maps 60 stored in the memory of controller 40. Next, in step 106, controller 40 may simultaneously adjust the first component to achieve the desired or required operational change and the one or more affected components to account for the effects of the adjustment to the first component.

The strategy implemented by controller 40 to regulate the air flow characteristics of engine 10 using the data contained in the maps 60 may result in reduced instability. To illustrate how the controller 40 may use the maps 60 to reduce instability, consider, by way of example, the interaction between the throttle valve 24 and turbine 50 that may occur in the absence of maps 60 containing data on the interrelated operation of the components. Based on an input from sensor 46, controller 40 may determine that an increase in intake air flow is desired or required, determine that throttle valve 24 should be adjusted to allow greater air flow into combustion chambers 15, and implement the adjustment. However, without intervention, as throttle valve 24 is adjusted to allow greater airflow, compressor 20 may be rotating too slowly to provide the desired pressure and amount of intake air. Based on input from sensor 46, an adjustment to the vanes of turbine 50 may be made to decrease the effective size of turbine 50, thereby increasing the rotational speed of compressor 20 and providing greater intake air pressure. Subsequently, this increased speed of compressor 20 may result in more air being supplied to engine 10, and thus a restricting movement of throttle valve 24 may be required. This sequence of changes may continue until stable operation of engine 10 is finally achieved.

With the assistance of data contained in the maps 60 stored in the memory of controller 40, however, system instability may be reduced by determining a desired or required adjustment of throttle valve 24 and determining the effect that adjustment will have on the operation of turbine 50 and compressor 20. Controller 40 may then simultaneously make single corresponding adjustments to both throttle valve 24 and turbine 50.

A second example of how controller 40 may use the maps 60 to reduce instability may be illustrated by further interaction between turbine 50 and throttle valve 24 that may occur in the absence of maps 60 containing data on the interrelated operation of the components. Controller 40 may, based on input from sensor 46, determine that an increase in intake air pressure is required. Controller 40 may determine that an adjustment to the vanes of turbine 50 to decrease its effective size may provide the required or desired pressure increase of air exiting compressor 20. This adjustment to turbine 50 may require an adjustment to throttle valve 24 to maintain the desired volume of air to combustion chambers 15 at the increased intake air pressure. However, without intervention, as throttle valve 24 is adjusted to increase airflow, the volume of exhaust gas entering turbine 50 from engine 10 may increase, thereby requiring an adjustment to the vanes of turbine 50 to increase its effective size to maintain the desired or required characteristics of compressor 20. This sequence of changes may continue until stable operation of engine 10 is finally achieved.

With the assistance of data contained in the maps 60 stored in the memory of controller 40, however, system instability may be reduced by determining a desired or required adjustment of turbine 50 and determining the effect that adjustment will have on throttle valve 24. Controller 40 may then simultaneously make single corresponding adjustments to both turbine 50 and throttle valve 24.

A third example of how controller 40 may use the maps 60 to reduce instability may be illustrated by the interaction between bypass valve 25 and EGR valve 52 that may occur in the absence of maps 60 containing data on the interrelated operation of the components. Based on an input from sensor 46, controller 40 may determine that an increase in intake air flow is desired or required, determine that bypass valve 25 should be restricted to divert less air back into compressor 20 and allow more air into combustion chamber 15, and implement a corresponding adjustment to bypass valve 25. As less air is diverted back into compressor 20 by bypass valve 25, controller 40 may then determine that the resulting exhaust-to-air ratio is too low for emission regulation compliance. Controller 40 may then determine that additional exhaust must be supplied, and adjust EGR valve 52 accordingly. However, as EGR valve 52 is adjusted to supply more exhaust to compressor 20, bypass valve 25 may need to be adjusted a second time to reduce a total fluid flow into engine 10. This sequence of changes may continue until stable operation of engine 10 is finally achieved.

With the assistance of data contained in the maps 60 stored in the memory of controller 40, however, system instability may be reduced by determining a desired or required adjustment of bypass valve 25 and determining the effect that adjustment will have on EGR valve 52. Controller 40 may then simultaneously make single corresponding adjustments to both bypass valve 25 and EGR valve 52.

A fourth example of how controller 40 may use the map 60 to reduce instability may be illustrated by the interaction between EGR valve 52 and bypass valve 25 that may occur in the absence of maps 60 containing data on the interrelated operation of the components. Based on an input from sensor 46, controller 40 may determine that an increase in exhaust air returned to combustion chamber 15 is required, determine that EGR valve 52 should be adjusted to divert more exhaust into compressor 20, and implement a corresponding adjustment to EGR valve 52. As more exhaust is returned to compressor 20 by EGR valve 52, compressor 20 may pressurize the increased volume of fluid too much. Controller 40 may then adjust bypass valve 25 to divert more air back into the compressor 20. However, the adjustment of bypass valve 25 may require a second adjustment to EGR valve 52 to divert less exhaust to compressor 20, in order to maintain the required flow of air and exhaust to combustion chambers 15. This sequence of changes may continue until stable operation of engine 10 is finally achieved.

With the assistance of data contained in the maps 60 stored in the memory of controller 40, however, system instability may be reduced by determining a desired or required adjustment of EGR valve 52 and determining the effect that adjustment will have on bypass valve 25. Controller 40 may then simultaneously make single corresponding adjustments to both EGR valve 52 and bypass valve 25.

The examples in the preceding paragraphs illustrate ways in which the disclosed method may decrease system instability. The single, simultaneous adjustment of two or more components to initiate a desired or required operational change and to account for the effects of the adjustment to the first component may reduce system instability by eliminating the need for successive, reactive adjustments. Reduced instability is desirable because it may allow engine 10 to more quickly reach the desired or required operating state, which may also result in more efficient operation. Those skilled in the art will recognize that the use of the maps 60 to allow controller 40 to determine interrelated effects to various components based on a single desired or required adjustment to a single component may be applicable to various components and various types of adjustments that may be desired or required over a wide range of engine operating conditions, and therefore may increase operating stability over a wide range of engine operating conditions.

The strategy implemented by controller 40 to regulate the air flow characteristics of engine 10 may result in a less expensive and less mechanically complex system as compared to the prior art. For example, the disclosed fluid control system may use only those components that already exist in engine 10, without the need for additional components that would be necessary only to increase system stability.

It will be apparent to those skilled in the art that various modifications and variations can be made to the disclosed fluid control system without departing from the scope of the disclosure. Other embodiments of the fluid control system will be apparent to those skilled in the art from consideration of the specification and practice of the fluid control system disclosed herein. It is intended that the specification and examples be considered as exemplary only, with a true scope of the disclosure being indicated by the following claims and their equivalents.

What is claimed is:

1. A method of regulating fluid flow through an engine, comprising:
   determining a first operational change associated with a turbocharger to achieve desired operation of the engine;
   determining an effect the first operational change will have on performance of an EGR valve, wherein determining the effect of the operational change includes referencing a map stored in a memory, wherein the map includes testing information relating the turbocharger and the EGR valve; and
   adjusting operation of the EGR valve to accommodate the effect while substantially simultaneously implementing the first operational change.

2. The method of claim 1, further including:
determining a second operational change associated with the EGR valve to achieve desired operation of the engine;
determining a second effect the second operational change will have on performance of the turbocharger; and
adjusting operation of the turbocharger to accommodate the second effect while substantially simultaneously implementing the second operational change.

3. The method of claim 2, wherein:
the EGR valve is operable to selectively allow exhaust gas to flow from an exhaust system to an air induction system; and
the second operational change includes changing the rate at which the exhaust gas flows from the exhaust system to the air induction system.

4. The method of claim 2, wherein: the turbocharger includes a variable geometry turbocharger, the variable geometry turbocharger including vanes, and adjusting operation of the turbocharger includes changing the position of the vanes.

5. The method of claim 1, wherein:
the turbocharger includes a variable geometry turbocharger, the variable geometry turbocharger including vanes, and
the first operational change includes changing the position of the vanes.

6. The method of claim 1 wherein:
the EGR valve is operable to selectively allow exhaust gas to flow from an exhaust system to an air induction system; and
adjusting operation of the EGR valve includes changing the rate at which the exhaust gas flows from the exhaust system to the air induction system.

7. A fluid control system for an engine, comprising:
an engine air induction system;
an engine exhaust system;
a turbocharger including a compressor located in the air induction system and a turbine located in the exhaust system;
an EGR valve operable to selectively allow exhaust gas to flow from the exhaust system to the air induction system;
a controller in communication with the turbocharger and the EGR valve, the controller further including a memory, and the controller being configured to:
determine a first operational change associated with the turbocharger to achieve desired operation of the engine;
determine an effect the first operational change will have on performance of the EGR valve, wherein determining the effect of the first operational change includes referencing a map stored in the memory, wherein the map includes testing information relating the turbocharger and the EGR valve; and
adjust operation of the EGR valve to accommodate the effect substantially simultaneously with implementation of the first operational change.

8. The fluid control system of claim 7, wherein the controller is further configured to:
determine a second operational change associated with the EGR valve to achieve desired operation of the engine;
determine a second effect the second operational change will have on performance of the turbocharger; and
adjust operation of the turbocharger to accommodate the second effect substantially simultaneously with implementation of the second operational change.

9. The fluid control system of claim 7, wherein the turbocharger is a variable geometry turbocharger.

10. The fluid control system of claim 9, wherein the first operational change includes changing the position of vanes of the variable geometry turbocharger.

11. The fluid control system of claim 7, wherein:
the air induction system includes an atmospheric air intake and an engine intake manifold; and
the compressor is located between the air intake and the engine intake manifold.

12. The fluid control system of claim 7, wherein:
the exhaust system includes an exhaust exit to atmospheric air and an exhaust manifold; and
the turbine is located between the exhaust manifold and the exhaust exit to atmospheric air.

13. The fluid control system of claim 7, wherein:
the air induction system includes an atmospheric air intake and an engine intake manifold;
the compressor is located between the air intake and the engine intake manifold; and
the EGR valve is operable to selectively allow exhaust gas to flow from between the turbine and the exhaust exit in the exhaust system to between the atmospheric air intake and compressor in the air induction system.

14. The fluid control system of claim 7, wherein the controller is further configured to:
determine a second operational change associated with the turbocharger to achieve desired operation of the engine;
determine a second effect the second operational change will have on performance of the EGR valve; and
adjust operation of the EGR valve to accommodate the second effect substantially simultaneously with implementation of the second operational change.

15. A fluid control system for an engine, comprising:
an engine air induction system;
an engine exhaust system;
a turbocharger including a compressor located in the air induction system and a turbine located in the exhaust system;
an EGR valve operable to selectively allow exhaust gas to flow from the exhaust system to the air induction system;
a controller in communication with the turbocharger and the EGR valve, the controller further including a memory, and the controller being configured to:
determine a first operational change associated with the EGR valve to achieve desired operation of the engine;
determine an effect the first operational change will have on performance of the turbocharger, wherein determining the effect of the first operational change includes referencing a map stored in the memory, wherein the map includes testing information relating the turbocharger and the EGR valve; and
adjust operation of the turbocharger to accommodate the effect substantially simultaneously with implementation of the first operational change.

* * * * *